US 6,561,243 B2

(12) United States Patent
Zanzig et al.

(10) Patent No.: US 6,561,243 B2
(45) Date of Patent: May 13, 2003

(54) TIRE HAVING TREAD WITH COLORED SIDEWALL IN CONNECTION WITH A PLURALITY OF COLORED TREAD GROOVES

(75) Inventors: David John Zanzig, Uniontown, OH (US); Brian David Holden, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 182 days.

(21) Appl. No.: 09/775,226

(22) Filed: Feb. 1, 2001

(65) Prior Publication Data

US 2002/0144761 A1 Oct. 10, 2002

(51) Int. Cl.$^7$ .............................. B60C 1/00; B60C 11/00
(52) U.S. Cl. .............................. 152/209.5; 152/209.16; 152/524; 152/DIG. 12
(58) Field of Search ...................... 152/154.2, 209.5, 152/524, DIG. 12, 209.16

(56) References Cited

U.S. PATENT DOCUMENTS

| | | | |
|---|---|---|---|
| 2,272,891 A | * | 2/1942 | Coben |
| 3,814,160 A | * | 6/1974 | Creaser |
| 5,094,829 A | | 3/1992 | Krivak et al. ............... 423/339 |
| 5,679,728 A | | 10/1997 | Kawazura et al. .......... 523/215 |
| 5,708,069 A | | 1/1998 | Burns et al. ................ 524/403 |
| 5,750,610 A | | 5/1998 | Burns et al. ................ 524/434 |
| 5,789,514 A | | 8/1998 | Burns et al. ................... 528/12 |
| 5,817,719 A | * | 10/1998 | Zanzig et al. |
| 6,028,137 A | | 2/2000 | Mahmud et al. ............ 524/496 |
| 6,147,166 A | * | 11/2000 | Araki et al. |
| 6,397,912 B1 | * | 6/2002 | Watanabe et al. |
| 6,441,070 B1 | * | 8/2002 | Halasa et al. |

FOREIGN PATENT DOCUMENTS

| | | | |
|---|---|---|---|
| DE | 9102607.5 | * | 7/1991 |
| EP | 864447 | * | 9/1998 |
| JP | 53-146779 | * | 12/1978 |
| JP | 61-146605 | * | 7/1986 |
| JP | 63-17103 | * | 1/1988 |
| JP | 11-151908 | * | 6/1999 |
| WO | 9901299 | | 1/1999 |
| WO | WO 99/06228 | * | 2/1999 |

OTHER PUBLICATIONS

"A New Isobutylene Copolymer: Non–tire Uses" by D. Kruse and J. Fusco, *Rubber & Plastics News*, Feb. 1, 1993.
*Introduction to Organic Chemistry*, $2^{nd}$ Edition by A. Steitwieser, Jr. and C. H. Heathcock; p. 829.

* cited by examiner

*Primary Examiner*—Steven D. Maki
(74) *Attorney, Agent, or Firm*—Henry C. Young, Jr.

(57) ABSTRACT

The present invention relates to a tire with a colored sidewall joined with a plurality of colored grooves in its tread. In particular, the present invention relates to a tire of a black-colored rubber composition having a non-black colored sidewall portion which is integral with a plurality of non-black colored grooves of a tread of lug and groove configuration. For said tread, at least a portion of the visible surface of a plurality of tread grooves, exclusive of the outer surface portion of said carbon black reinforced rubber lugs intended to be ground-contacting, is of a non-black colored, synthetic amorphous silica reinforced rubber composition exclusive of carbon black. For said colored sidewall and plurality of connecting tread groove combination, said tread groove and sidewall may be of the same or different non-black color(s). In one aspect, said non-black visible surface of said tread grooves and connecting sidewall contains an elastomeric brominated copolymer of isobutylene and p-methyl styrene in combination with an organo phosphite compound.

13 Claims, 1 Drawing Sheet

US 6,561,243 B2

Figure 1:
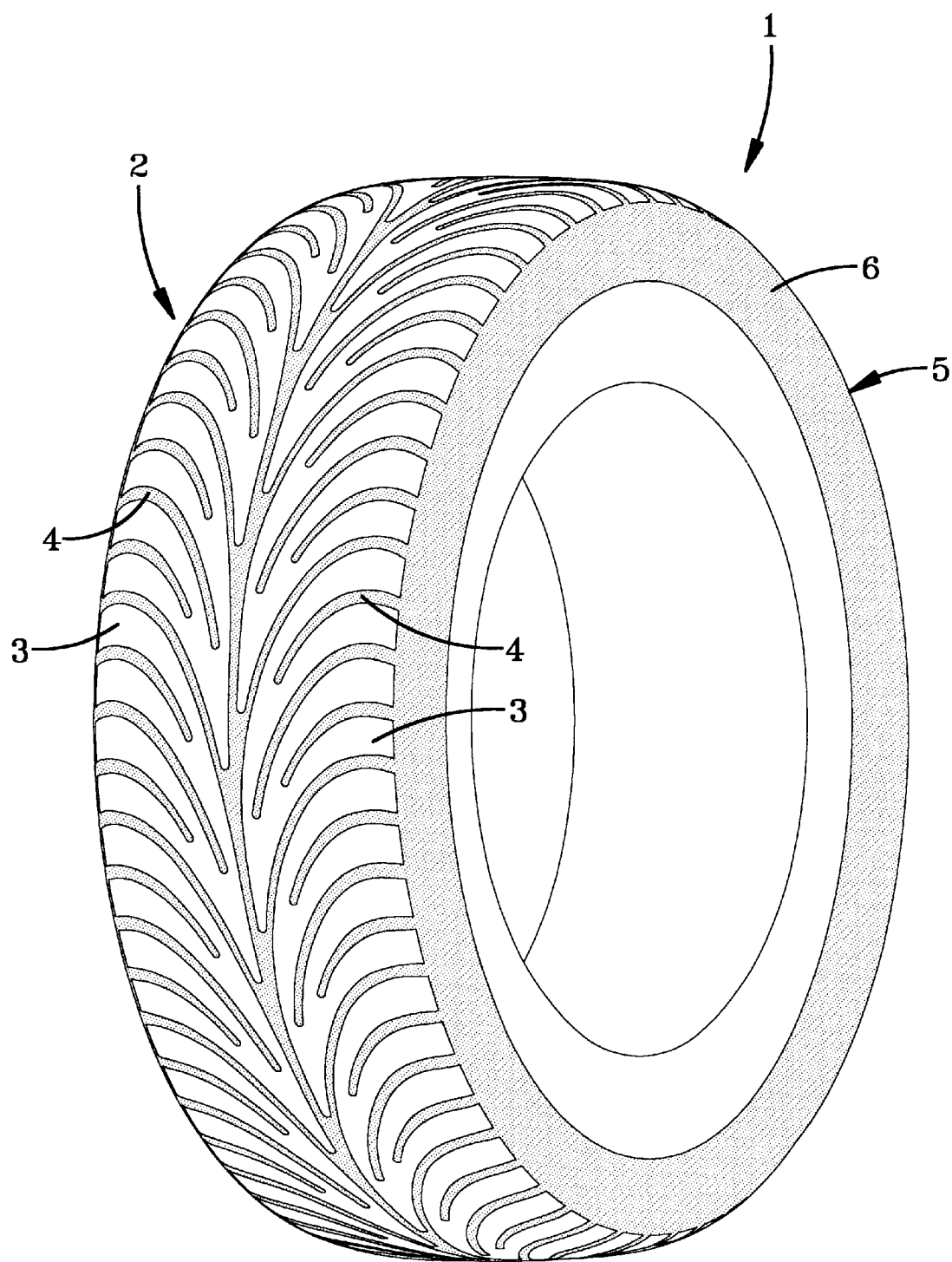

TIRE HAVING TREAD WITH COLORED SIDEWALL IN CONNECTION WITH A PLURALITY OF COLORED TREAD GROOVES

FIELD OF THE INVENTION

The present invention relates to a tire with a colored sidewall joined with a plurality of colored grooves in its tread. In particular, the present invention relates to a tire of a black-colored rubber composition having a non-black colored sidewall portion which is integral with a plurality of non-black colored grooves of a tread of lug and groove configuration. For said tread, at least a portion of the visible surface of a plurality of tread grooves, exclusive of the outer surface portion of said carbon black reinforced rubber lugs intended to be ground-contacting, is of a non-black colored, synthetic amorphous silica reinforced rubber composition exclusive of carbon black. For said colored sidewall and plurality of connecting tread groove combination, said tread groove and sidewall may be of the same or different non-black color(s). In one aspect, said non-black visible surface of said tread grooves and connecting sidewall contains an elastomeric brominated copolymer of isobutylene and p-methyl styrene in combination with an organo phosphite compound.

BACKGROUND OF THE INVENTION

Most tires have a tread of a lug and groove configuration of a rubber composition which contains carbon black and is therefore black in color.

It may sometimes be desired to provide a tire with a colored sidewall. Such colored sidewalls are normally prepared by providing a sidewall rubber composition which is devoid of carbon black and contains white titanium dioxide as a coloring pigment.

It may sometimes desired to provide a tire with a colored tread. In such case, the tread rubber composition is also devoid of carbon black and, in order to achieve suitable tread rubber physical properties, a particulate, synthetic amorphous silica is used to reinforce the rubber and a colorant added to achieve the desired color for the tire tread For example, see PTC patent application WO 99/01299 and also Austrian Patent No. 335 726.

It should pointed out that it is considered herein that a significant disadvantage of tires with treads of lug and groove configuration where the outer surface of the tread lugs designed to be ground-contacting is of a non-black color is (A) a tendency of such tire tread lugs to leave colored markings on the road over which they travel, which can be objectionable where such roads have other colored markings designed to aid or control vehicular traffic patterns and (B) a tendency of the outer non-black tread lug surface to become discolored, particularly unevenly discolored, as the outer surface of the tread lugs travel over surfaces such as, for example, asphalt roads.

Therefore, it may sometimes be desirable to provide a tire tread where its grooves are of a non-black color and, further, to provide such tread where such colored grooves communicate with a colored tire sidewall both of which are exclusive of carbon black and are silica reinforced.

It should be appreciated that rubber compositions based upon sulfur curable diene derived elastomers which contain carbon-to-carbon double bond unsaturation in their elastomer backbone may be reinforced with silica and be exclusive of carbon black.

A coupling agent is often used for such silica reinforced rubber compositions to aid in enabling the silica to effectively reinforce the rubber composition to achieve suitable physical properties whether for the tire tread or tire sidewall. Widely used coupling agents for such purpose are comprised of a moiety (e.g. an alkoxysilane moiety) which is reactive with hydroxyl groups (e.g. silanol groups) on the surface of the silica and another moiety (e.g. a polysulfide moiety) which is interactive with unsaturated elastomers which contain carbon-to-carbon double bonds in their elastomer backbone. Such silica coupling agent activity is believed to be well known to those skilled in such art.

However, saturated elastomers, which inherently do not have carbon-to-carbon double bond in their backbone, such as halogenated (e.g. brominated) copolymers of isobutylene and p-methyl styrene elastomers inherently do not respond to sulfur bonding or crosslinking in the manner of unsaturated diene-based elastomers.

Accordingly, coupling agents for the silica which rely upon an interaction with diene-based elastomers which contain carbon-to-carbon double bonds unsaturation in their backbone, namely polysulfide based couplers such as, for example bis(3-alkoxysilylalkyl) polysulfides, are considered herein to have limited value for coupling the silica to the elastomer, even when the rubber composition contains a diene hydrocarbon based elastomer, wherein the rubber composition has an appreciable amount of an elastomeric brominated copolymer of isobutylene and p-methyl styrene.

Such copolymers typically have a ratio of isobutylene to p-methyl styrene in a range of about 50/1 to 7/1.

In practice, the aforesaid saturated halogenated copolymer elastomer might be prepared, for example, by first copolymerizing isobutylene and p-methyl styrene. Usually a ratio of isobutylene to p-methyl styrene in a range of about 50/1 to about 7/1 is used. The resulting copolymer is then halogenated with a halogen such as bromine which occurs at the paramethyl position, yielding a benzyl bromide functionality. The degree of bromination can typically be varied from about 0.5 to about 2.5, usually preferably about 1.5 to about 2.5, weight percent, based upon the copolymer of isobutylene and p-methyl styrene.

The following reference provides additional information relating to the preparation of such halogenated copolymers: "A New Isobutylene Copolymer; Non-tire Uses" by D. Kruse and J. Fusco, *Rubber & Plastics News*, Feb. 1, 1993".

Such brominated copolymer of isobutylene and p-methyl styrene may, for example, have physical properties such as, for example, a Mooney viscosity value (ML(1+8) at 125° C.) in a range of about 35 to about 60 and a Tg in a range of about −50° C. to about −60° C.

It is to be appreciated that such halogenated (e.g. brominated) copolymer elastomer has a completely saturated backbone as being devoid of carbon-to-carbon double bond unsaturation and therefore is uniquely useful for a rubber composition where stability of various of its physical properties desired when the rubber composition is exposed to atmospheric conditions which conventionally attack unsaturated diene-based elastomers and particularly oxidative influences of ozone.

However, the utility for such halogenated saturated elastomers is limited because, as hereinbefore discussed, because of its lack of carbon-to-carbon double bonds, it is not considered as being reactive with sulfur and is therefore not ordinarily considered as being sulfur curable in a sense of diene hydrocarbon-based elastomers.

Historically, some organo phosphites have previously been recognized as being reactive with alkyl halides. For example, see *Introduction to Organic Chemistry, 2nd Edition*, by A. Steitwieser, Jr and C. H. Heathcock, Page 829, which refers to a Arbuzov-Michaelis reaction of a phosphite with an alkyl halide.

It is contemplated herein to apply such indicated alkyl halide activity of organo phosphites for enhancing the utilization of silica reinforcement of rubber compositions which contain a halogenated copolymer of isobutylene and p-methyl styrene.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicate. The terms "cure" and "vulcanize" may be used interchangeably unless otherwise indicated.

SUMMARY AND PRACTICE OF THE INVENTION

In accordance with this invention, a tire is provided having two spaced apart individual rubber sidewalls and a circumferential tread of a lug and groove configuration, wherein a portion of said sidewalls is joined at the periphery of said tread with a plurality of said tread grooves; wherein said sidewall portions and said plurality of tread grooves are exclusive of carbon black and therefore of a non-black color; and wherein said the outer surface of said treads lugs designed to be ground-contacting contain carbon black reinforcement and are therefore of a black color; and wherein said sidewall portions and said joined tread grooves contain a particulate, synthetic amorphous silica reinforcement; wherein said non-black colored sidewall portions and joined non-black colored tread grooves are of a non-black colored rubber composition which comprises, based upon parts by weight per 100 parts by weight elastomer(s), (phr):

(A) 100 phr of elastomer comprised of
   (1) from zero to about 80, alternately about 5 to about 80, alternately about 10 to about 50, phr of a halogenated copolymer of isobutylene and p-methyl styrene, wherein said halogen is selected from bromine or iodine, preferably bromine,
   (2) about 20 to about 100, alternately about 20 to about 95, alternately about 50 to about 90, phr of at least one diene-based elastomer and (B) about 25 to about 100, optionally about 35 to about 90, phr of particulate reinforcing filler comprised of synthetic amorphous silica aggregates, wherein said silica aggregates contain hydroxyl groups (e.g. silanol groups) on their surface; and (C) from zero to about 25, and wherein said halogenated copolymer is present, then from about 0.5 to about 25, alternately about 1 to about 15, phr of an organo phosphite selected from monophosphites selected from formula (I) and diphosphites selected from formula (II) and diisodecyl pentearythritol diphosphite, distearyl pentaerythritol diphosphite and pentearythritol diphosphite, preferably monophosphites of formula (I):

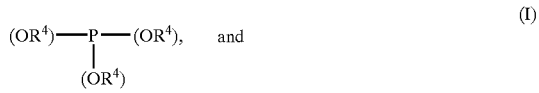

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is preferably the organo phosphite of formula (I)

wherein said organo phosphite is provided by one or more of the following:
   (a) by mixing said organo phosphite with said elastomer(s) and said synthetic silica in an internal rubber mixer,
   (b) by pre-reacting said halogenated copolymer of isobutylene and p-methyl styrene with said organo phosphite prior to blending said reinforcing filler therewith,
   (c) by pre-reacting said organo phosphite with an aqueous dispersion of colloidal silica particles from which a precipitated silica is recovered to form an organo phosphite/silica composite thereof,
   (d) by mixing said organo phosphite with said elastomer(s) and said synthetic silica, preferably in an internal rubber mixer, according to any of said steps (a), (b) or (c), wherein said synthetic silica includes pre-hydrophobated silica aggregates which have been pre-hydrophobated prior to mixing with said elastomers with an alkylsilane of formula (III),
   (e) by mixing said organo phosphite with said elastomer(s) and an alkylsilane of the said Formula (III) with said elastomer(s) and said synthetic silica, preferably in an internal rubber mixer, and
   (f) by pre-reacting said organo phosphite and said alkylsilane of Formula (III), and optionally an organomercaptosilane of the general formula (IV), with
      (i) said aggregates of synthetic precipitated silica or
      (ii) an aqueous dispersion of colloidal silica particles from which a precipitated silica is recovered to form a silica composite thereof;

wherein said alkylsilane of the general Formula (III) is represented by

wherein R is an alkyl radical having from one to 18 carbon atoms, n is a value of from 1 to 3 and X is a radical selected from chlorine or bromine or alkoxy radical as (OR1)—, wherein R1 is an alkyl radical selected from methyl and ethyl radicals, and where said organomercaptosilane is of the general formula (IV):

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3.

In the practice of this invention, said rubber composition may also contain an additional coupling agent as, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or from 3.5 to 4, sulfur atoms in its polysulfidic bridge.

Representative of such other coupling agents are, for example, bis(3-triethoxysilylpropyl) polysulfide having an average of from 2 to 2.6 or from 3.5 to 4, sulfur atoms in its polysulfidic bridge.

Such additional coupling agent may, for example, be added directly to the elastomer mixture or may be added as a composite of precipitated silica and such coupling agent formed by treating a precipitated silica therewith or by treating a colloidal silica therewith and precipitating the resulting composite.

In further accordance with this invention, said tire is provided wherein at least one component thereof is in contact with said non-black colored sidewall and/or non-black colored groove is of a black colored rubber comprised of said non-black colored rubber composition, wherein, however, said particulate reinforcing filler is comprised of about 25 to about 100, optionally about 35 to about 90, phr of particulate reinforcing filler comprised of about 25 to about 100, optionally about 35 to about 90, phr of particulate reinforcing filler comprised of (A) from zero to about 100, alternately about 10 to about 85, phr of synthetic amorphous silica aggregates and, correspondingly, (B) from zero to about 75, alternately about 10 to about 60 phr of at least one of carbon black and silica treated carbon black having domains of silica on its surface.

wherein said silica aggregates contain hydroxyl groups (e.g. silanol groups) on their surface.

A significant aspect of this invention is the use of a reaction product of said organo phosphite and a said halogenated (preferably brominated) copolymer of isobutylene and p-methyl styrene in order to improve the polymer (e.g. elastomer) to filler interaction (via reaction of the organo phosphite with the halogen of the halogenated copolymer of isobutylene and p-methyl styrene) to thereby enhance resulting rubber composition properties leading to enhanced tire component (e.g. tire tread) properties including aged performance such as, for example durability and/or stability properties.

Representative examples of organo phosphites understood to be commercially available are, for example for example, triisodecyl phosphite, trilauryl phosphite, tris (tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, as well as tris (2,4-di-t-butylphenyl) phosphite, and bis 2,4,6,tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di,t-butyl-4-methylphenyl pentaerythritol diphosphite, bis (2,4-dicumylphenyl) pentaerythritol diphosphite and mixtures thereof.

Such organo phosphite may be, for example, tris (2-ethylhexyl) phosphite.

In practice, the synthetic amorphous silica may be selected from aggregates of precipitated silica, which is intended to include precipitated aluminosilicates as a co-precipitated silica and aluminum, and from fumed (pyrogenically formed) silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

In the further practice of the invention, the aforesaid in situ reaction of said organo phosphite silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the organo phosphite and pre-hydrophobated silica material as to a resulting product thereof. In particular, is it considered herein that pre-hydrophobation of the silica material, particularly with an alkyl silane of the general formula (II) enables a more efficient mixing, or processing, of it within the elastomer host in that such pre-hydrophobation of the silica material (A) renders it more compatible with the diene-based elastomer and (B) substantially reduces a tendency for a precipitated silica to agglomerate with itself within the elastomer host.

In the practice of this invention, said pre-hydrophobated precipitated silica aggregates may be pre-hydrophobated, for example, by treating silica in an aqueous colloidal form thereof with said alkylsilane of Formula (III).

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to U.S. Pat. No. 5,094,829 as well as U.S. Pat. Nos. 5,708,069, 5,789,514 and 5,750,610 for a more detailed discussion.

Representative alkylsilanes of Formula (III) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptosilanes of formula (IV) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

The brominated poly(isobutylene-co-para-methylstyrene) polymer may be obtained, for example, as Exxpro 3745, a trademark of the ExxonMobil Chemical Company.

Various colorants might be used for the non-black colored rubber composition used in this invention, if desired. For example, such colorants might be pigments, classified according to CAS numbers, for example, red 38 CAS 6358-87-8; violet 32 CAS 12225-0800; blue 15 CAS 147-14-8, copper phthalocyanine; blue 29, CAS 57455-37-5, ultramarine blue; violet 19 CAS 1047-16-1; yellow 110 CAS 106276-80-6, yellow 109 CAS 106276-79-3; and white 6 CAS 13463-67-7, titanium dioxide.

While commonly employed synthetic amorphous silica, or siliceous pigments, used in rubber compounding applications can be used as the silica in this invention, including precipitated siliceous pigments and fumed (pyrogenic) silica, as earlier presented herein said silica is preferably in a form of aggregates of a synthetic, amorphous precipitated silica.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm$^3$/100 g, and more usually about 100 to about 300 cm$^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber as, for example, Zeopol 8745 and Zeopol 8715, silicas from Degussa AG with, for example, designations VN2 and VN3, as well as other grades of silica, particularly precipitated silicas, which can be used for elastomer reinforcement.

For a further understanding of this invention, a drawing is provided and identified herein as FIG. 1 which depicts a perspective view of a tire cross-section with a tread which contains non-black colored grooves which connect directly with a non-black colored sidewall portion of the tire.

Referring to FIG. 1, such tire 1 is depicted with a tread 2 configured with lugs 3 and grooves 4 which connects to a sidewall 5.

In particular, said tread 2 and sidewall 5 is of different carbon black reinforced rubber compositions and therefore are of a black color.

At least a part of the visible portion of the tread grooves 4, exclusive of the outer surface of the lugs 3 designed to be ground contacting, are of a non-black colored rubber composition which contains silica reinforcement to the exclusion of carbon black reinforcement, together with as purple colored colorant and therefore is of a non-black color. Such non-black colored rubber composition extends to, joins and thereby includes at least a visible portion 6 of the tire sidewall 5 adjacent to the tread 2.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization an organo phosphite for enhancing reinforcement of a halogenated (e.g. brominated) poly (isobutylene-co-para-methylstyrene) polymer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

EXAMPLE I

In this Example, a rubber composition which contained carbon black reinforcement, thereby of a black color, and a rubber composition which contained silica reinforcement, exclusive of carbon black and containing a purple colorant and thereby of a purple color were prepared by mixing the ingredients in an internal rubber mixer in a sequential series of non-productive (without sulfur and accelerators) mixing steps and a final productive (with sulfur and accelerator addition at a lower mix temperature) mixing step.

For the carbon black-containing rubber composition, a total of two non productive mixing steps were used and for the silica reinforced rubber composition, a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Sample B utilizes the silica reinforcement together with a paraffinic rubber processing oil, non-staining phenolic antioxidant and a silica coupling agent.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A and B.

TABLE 1

|  | Control Sample A | Sample B |
|---|---|---|
| First Non-Productive Mixing Step (to 160° C.) | | |
| Styrene/butadiene rubber[1] | 0 | 80 |
| Polybutadiene rubber[2] | 0 | 20 |
| Styrene/butadiene rubber[3] | 96.25 | 0 |
| Budene 1254[4] | 37.5 | 0 |
| Carbon black[5] | 70 | 0 |
| Silica[6] | 0 | 50 |
| Coupling Agent[7] | 0 | 3.9 |
| Aromatic processing oil | 10 | 0 |
| Paraffinic processing oil | 0 | 20 |
| Antioxidant[8] | 0 | 2 |
| Zinc oxide | 2 | 2 |
| Fatty acid[9] | 2 | 3 |
| Second Non-Productive Mixing Step (to 160° C.) | No | Yes |
| Silica[6] | 0 | 20 |
| Coupling agent[7] | 0 | 1.6 |
| Paraffinic processing oil | 0 | 8 |
| Productive Mixing Step (to 115° C.) | | |
| Accelerator(s)[10] | 1.3 | 3.5 |
| Sulfur | 1.5 | 1.4 |
| Antidegradant(s)[11] | 1.2 | 0 |
| Colorant (purple)[12] | 0 | 2 |

[1]Emulsion polymerization prepared styrene/butadiene rubber obtained as Plioflex 1502 from The Goodyear Tire & Rubber Company
[2]Cis 1,4-polybutadiene rubber obtained as Budene 1207 from The Goodyear Tire & Rubber Company
[3]Oil extended emulsion polymerization prepared styrene/butadiene rubber obtained a Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, as ASTM designation
[6]Obtained as Zeopol ® 8745 from the J. M. Huber Corporation
[7]Obtained as liquid Si69 from Degussa AG, as a bis-(3-triethoxysilylproply) tetrasulfide
[8]Non-straining antioxidant Wingstay ® HLS from The Goodyear Tire & Rubber Company
[9]Primarily stearic acid
[10]Sulfenamide and diphenylguanidine or tetramethylthiuram disulfide type
[11]Mixed diaryl-p-phenylenediamine type antioxidant from The Goodyear Tire & Rubber Company
[12]Colorant obtained from Akrochem Corporation An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent parraffinic, 36 percent to 42 percent naphthenic and 11 percent to 14 percent aromatic.

The rubber composition of Table 1 were cured for about 14 minutes at about 160° C. Various resulting physical properties are shown in the following Table 2.

TABLE 2

|  | Sample A | Sample B |
|---|---|---|
| Rheometer, 160° C. | | |
| Maximum torque, (dNm) | 12 | 14 |
| Minimum torque, (dNm) | 2.5 | 1.4 |
| Delta torque, dNm (Max-min torque) | 9.5 | 12.6 |
| T90, minutes | 6.2 | 8.6 |
| Stress Strain (Modulus) | | |
| 100% modulus (MPa) | 1.2 | 1.4 |
| 300% modulus (MPa) | 4.7 | 6.1 |
| Tensile strength (MPa) | 17.4 | 18.6 |
| Elongation at break, (%) | 689 | 628 |
| Rebound | | |
| 100° C. | 47 | 59 |
| Hardness | | |
| Shore A, 100° C. | 48 | 51 |
| DIN Abrasion (10 N force) (cm³ loss) | 73 | 91 |

It is seen from Table 2 that Sample B, a purple colored sample, has superior 300 percent modulus, hardness and rebound as compared to Control Sample A. This is considered herein to be important such properties of a non-black colored rubber lamina for use as a tire tread or a tire sidewall.

EXAMPLE III

In this Example, Control Sample A of Example I is reported as it was in Example I which contained carbon black reinforcement without silica reinforcement and, also therefore without a silica coupling agent.

Samples C and D are reported herein as rubber samples which contain a brominated copolymer of isobutylene and para-methyl stryene rubber (also referred to as "BIMS" rubber as well as at least one diene-based elastomer and silica reinforcement.

Sample D also contained an organo phosphite, namely triphenyl phosphite, as a coupling agent for said BIMS.

For the Sample A carbon black-containing rubber composition, a total of two non productive mixing steps were used (Example I) and for the silica reinforced rubber compositions (Samples C and D) a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Samples C and D utilized the silica reinforcement together with a paraffinic rubber processing oil, non-staining phenolic antioxidant.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A (from Example I), C and D.

TABLE 3

|  | Control Sample A | Sample C | Sample D |
|---|---|---|---|
| First Non-Productive Mixing Step (to 160° C.) | | | |
| BIMS rubber[1] | 0 | 40 | 40 |
| Polybutadiene rubber[2] | 0 | 30 | 30 |
| Polyisoprene rubber | 0 | 30 | 30 |
| Styrene/butadiene rubber[3] | 96.25 | 0 | 0 |
| Budene 1254[4] | 37.5 | 0 | 0 |
| Carbon black[5] | 70 | 0 | 0 |
| Silica[6] | 0 | 66 | 66 |
| Aromatic processing oil | 10 | 0 | 0 |
| Paraffinic processing oil | 0 | 25 | 25 |
| Zinc oxide | 2 | 0 | 0 |
| Fatty acid[7] | 2 | 0 | 0 |
| Phosphite[8] | 0 | 0 | 10 |
| Second Non-Productive Mixing Step (to 160° C.) | No | Yes | Yes |
| Zinc Oxide | 0 | 2.5 | 2.5 |
| Antidegradants[9] | 0 | 3.0 | 3.0 |
| Carbon black[10] | 0 | 10 | 10 |
| Productive Mixing Step (to 115° C.) | | | |
| Accelerator(s)[11] | 1.3 | 3.5 | 3.5 |
| Sulfur | 1.5 | 2.2 | 2.2 |
| Antidegradant(s)[12] | 1.2 | 0 | 0 |

[1]Brominated copolymer of isobutylene and para-methyl stryene rubber obtained as Exxpro 3745 from The ExxonMobil Chemical Company
[2]Cis 1,4-polybutadiene rubber obtained as Budene 1207 from The Goodyear Tire & Rubber Company
[3]Oil extended emulsion polymerization prepared styrene/butadiene rubber obtained as Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, an ASTM designation
[6]Obtained as Zeopol® 8715 from the J. M. Huber Corporation
[7]Primarily stearic acid
[8]Triphenyl phosphite
[9]P-phenylenediamine type
[10]N472 carbon black, an ASTM designation
[11]Sulfenamide and diphenylguanidine or tetramethylthiuram disulfide type
[12]Mixed diaryl-p-phenylenediamine type antioxidant from The Goodyear Tire & Rubber Company An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 3 were cured for about 14 minutes at about 160° C. Various resulting physical properties are shown in the following Table 4, with the physical properties for Sample A simply taken from Table 2 of Example I.

TABLE 4

|  | Sample A | Sample C | Sample D |
|---|---|---|---|
| Stress Strain (Modulus) | | | |
| 100% modulus (MPa) | 1.2 | 1.6 | 1.2 |
| 300% modulus (MPa) | 4.7 | 8.5 | 4.8 |
| Tensile strength (MPa) | 17.4 | 11.5 | 10.9 |
| Elongation at break, (%) | 689 | 417 | 617 |
| Rebound | | | |
| 100° C. | 47 | 67 | 49 |

TABLE 4-continued

|  | Sample A | Sample C | Sample D |
|---|---|---|---|
| Hardness |  |  |  |
| Shore A, 100° C. | 48 | 51 | 51 |
| DIN Abrasion (10 N force) (cm³ loss) | 73 | 172 | 132 |
| Peel Adhesion (95° C.), N | 170 | 38 | 159 |

From Table 4 it is seen that moduli, rebound and hardness values for Sample C, which included the BIMS polymer and silica, are improved over the Sample A values which is indicative of improved tire handling an rolling resistance for tires having treads of such composition.

From Table 4 it is also seen that tear strength as measured in a peel adhesion test and abrasion resistance for Sample D are improved as compared to Sample C which is indicative of improved durability of the rubber composition. Moreover, the properties of Sample D are very similar to Sample A (e.g. modulus, elongation at break, rebound and peel adhesion) indicating good compatibility for Sample A and D rubber compositions when positioned next to each other in an article of manufacture such as, for example a tire.

While various embodiments are disclosed herein for practicing the invention, it will be apparent to those skilled in this art that various changes and modifications may be made therein without departing from the spirit or scope of the invention.

What is claimed is:

1. A tire comprised of two spaced apart individual rubber sidewalls and a circumferential tread of a lug and groove configuration including tread lugs designed to be ground contacting, wherein a portion of said sidewalls is joined at the periphery of said tread with a plurality of tread grooves; wherein said sidewall portions and said plurality of tread grooves are exclusive of carbon black and therefore of a non-black color; and wherein said the outer surface of said tread lugs designed to be ground-contacting contain carbon black reinforcement and are therefore of a black color; and wherein said sidewall portions and said joined tread grooves contain a particulate, synthetic amorphous silica reinforcement; wherein said non-black colored sidewall portions and joined non-black colored tread grooves are of a non-black colored rubber composition which comprises, based upon parts by weight per 100 parts by weight elastomer(s), (phr):

(A) 100 phr of elastomer comprised of
 (1) about 5 to about 80 phr of a halogenated copolymer of isobutylene and p-methyl styrene, wherein said halogen is selected from bromine or iodine,
 (2) about 20 to about 95 phr of at least one diene-based elastomer and
(B) about 25 to about 100 phr of particulate reinforcing filler comprised of synthetic amorphous silica aggregates, wherein said silica aggregates contain hydroxyl groups on their surface; and
(C) about 0.5 to about 25 phr of an organo phosphite selected from at least one of monophosphites selected from formula (I) and diphosphites selected from formula (II) and diisodecyl pentearythritol diphosphite, distearyl pentearythritol diphosphite and pentearythritol diphosphite:

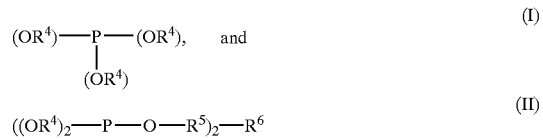

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is provided by one or more of the following:
 (a) by mixing said organo phosphite with said elastomer(s) and said synthetic silica in an internal rubber mixer,
 (b) by pre-reacting said halogenated copolymer of isobutylene and p-methyl styrene with said organo phosphite prior to blending said reinforcing filler therewith,
 (c) by pre-reacting said organo phosphite with an aqueous dispersion of colloidal silica particles from which a precipitated silica is recovered to form an organo phosphite/silica composite thereof,
 (d) by mixing said organo phosphite with said elastomer(s) and said synthetic silica, according to any of said steps (a), (b) or (c), wherein said synthetic silica includes pre-hydrophobated silica aggregates which have been pre-hydrophobated prior to mixing with said elastomers with an alkylsilane of formula (III),
 (e) by mixing said organo phosphite with said elastomer(s) and an alkylsilane of the said Formula (III) with said elastomer(s) and said synthetic silica, and
 (f) by pre-reacting said organo phosphite and said alkylsilane of Formula (III), and optionally an organomercaptosilane of the general formula (IV), with
  (i) said aggregates of synthetic precipitated silica or
  (ii) an aqueous dispersion of colloidal silica particles from which a precipitated silica is recovered to form a silica composite thereof;

wherein said alkylsilane of the general Formula (III) is represented by

wherein R is an alkyl radical having from one to 18 carbon atoms, n is a value of from 1 to 3 and X is a radical selected from chlorine, bromine and alkoxy radical as $(OR^1)$—, wherein $R^1$ is an alkyl radical selected from methyl and ethyl radicals, and where said organomercaptosilane is of the general formula (IV):

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3.

2. The tire of claim 1 whereon said organophosphite is the phosphite of formula (I).

3. The tire of claim 1 wherein said rubber composition contains an additional coupling agent as bis(3- trialkoxysilylalkyl) polysulfide wherein alkyl radicals for said alkoxy groups are selected from one or more of methyl and ethyl radicals and the alkyl radical for said silylalkyl component is selected from butyl, propyl and amyl radicals and wherein said polysulfide component contains from 2 to 8, with an average of from 2 to 2.6 or from 3.5 to 4, sulfur atoms in its polysulfidic bridge.

4. The tire of claim 3 wherein said coupling agent is a bis(3-triethoxysilylpropyl) polysulfide having an average of from 2 to 2.6 or from 3.5 to 4, sulfur atoms in its polysulfidic bridge.

5. The tire of claim 3 wherein said additional coupling agent is added
   (A) directly to the elastomer mixture, or is added
   (B) to the elastomer mixture as a composite of precipitated silica and said coupling agent formed by treating a precipitated silica therewith, or
   (C) by treating a colloidal silica therewith and precipitating the resulting composite.

6. The tire of claim 1 wherein at least one component of said tire in contact with said non-black colored sidewall and/or non-black colored groove is of a black colored rubber comprised of said non-black colored rubber composition, wherein, however, said particulate reinforcing filler is comprised of about 25 to about 100 phr of particulate reinforcing filler comprised of about 25 to about 100 phr of particulate reinforcing filler comprised of
   (A) from zero to about 100 phr of synthetic amorphous silica aggregates and, correspondingly,
   (B) from zero to about 75 phr of at least one of carbon black and silica treated carbon black having domains of silica on its surface
   wherein said silica aggregates contain hydroxyl groups on their surface.

7. The tire of claim 1 wherein said organo phosphites are selected from at least one of triisodecyl phosphite, trilauryl phosphite, tris(tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, tris (2,4-di-t-butylphenyl) phosphite, bis 2,4,6,tri-t-butylphenyl 2-butyl-2-ethyl-1,3-propanediol phosphite; distearyl pentaerythritol diphosphite, bis (2,4-di-t-butylphenyl) pentaerythritol diphosphite, bis (2,6,di,t-butyl-4-methylphenyl pentaerythritol diphosphite, bis (2,4-dicumylphenyl) pentaerythritol diphosphite and mixtures thereof.

8. The tire of claim 1 wherein said organo phosphite is tris (2-ethylhexyl) phosphite.

9. The tire of claim 1 wherein said silica is comprised of aggregates of precipitated silica having hydroxyl groups on the surface thereof.

10. The tire of claim 1 wherein said silica is comprised of pre-hydrophobated aggregates of precipitated silica having been pre-hydrophobated by treating silica in an aqueous colloidal form thereof with both an organomercaptosilane and an alkylsilane in a weight ratio of said organomercaptosilane to said alkylsilane in a range of from 10/90 to 90/10;
   wherein said alkylsilane is of the general Formula (III)

$$X_n\text{—Si—}R_{4-n} \quad (III)$$

wherein R is an alkyl radical selected from methyl, ethyl, isopropyl, n-butyl and octadecyl radicals, n is a value of from 1 to 3 and X is selected from a chlorine radical or an alkoxy radical as $(OR^1)\text{—}$, wherein R1 is selected from methyl and ethyl and where said organomercaptosilane is of the general formula (IV):

$$(X)_n(R^2O)_{3-n}\text{—Si—}R^3\text{—SH} \quad (IV)$$

wherein X is selected from a chlorine radical and an alkyl radical selected from at least one of methyl, ethyl, n-propyl and n-butyl radicals; wherein $R^2$ is an alkyl radical selected from methyl and ethyl radicals and $R^3$ is an alkylene radical having from one to 4 carbon atoms, and n is a value from zero to 3.2.

11. The tire of claim 1 wherein said alkylsilanes of Formula (III) are selected from at least one trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

12. The tire of claim 1 wherein said organomercaptosilanes of Formula (IV) are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

13. The tire of claim 1 wherein said elastomer composition for said non-black colored rubber composition and for rubber composition(s) in direct contact with said non-black colored tread rubber layer(s) are devoid of rubber processing oil other than paraffinic rubber processing oils which contains less than 16 weight percent aromatic compounds and is devoid of amine based antidegradants.

\* \* \* \* \*